United States Patent [19]

Nikolayczik

[11] Patent Number: 4,513,781

[45] Date of Patent: Apr. 30, 1985

[54] SANITARY SINGLE-CONTROL MIXER FITTING

[75] Inventor: Hans Nikolayczik, Minheim, Fed. Rep. of Germany

[73] Assignee: American Standard Inc., New York, N.Y.

[21] Appl. No.: 623,674

[22] Filed: Jun. 22, 1984

[30] Foreign Application Priority Data

Mar. 21, 1983 [DE] Fed. Rep. of Germany .... 3310080

[51] Int. Cl.³ .................... F16K 11/06; F16K 19/00
[52] U.S. Cl. ........................... 137/625.41; 137/625.17
[58] Field of Search ........... 137/625.17, 625.4, 625.41, 137/625.48

[56] References Cited

U.S. PATENT DOCUMENTS

| | | | |
|---|---|---|---|
| 2,977,986 | 4/1961 | Hinderer et al. | 137/625.17 |
| 3,433,264 | 3/1969 | Parkison | 137/625.17 |
| 3,533,444 | 10/1970 | Lyon | 137/625.17 |
| 3,543,799 | 12/1970 | Hayman | 137/625.17 |
| 3,736,959 | 6/1973 | Parkison | 137/625.17 |
| 3,920,043 | 11/1975 | Fowell | 137/625.17 |
| 4,088,153 | 5/1978 | Paasikivi | 137/625.17 |

Primary Examiner—Alan Cohan
Assistant Examiner—John A. Rivell
Attorney, Agent, or Firm—James J. Salerno, Jr.; Robert G. Crooks; John P. Sinnott

[57] ABSTRACT

A sanitary single-control mixer fitting with regulating elements is formed having at least two discs, of which one serves as a static valve seat disc and includes two inlet ports for cold and hot water, as well as an outlet port. The second disc is shiftably mounted on the valve seat disc and includes a mixing chamber cavity, which is sufficiently dimensioned to partially or completely connect the inlet ports with the outlet port of the valve seat disc. The mixing chamber cavity in the shiftable disc is of asymmetrical form in relation to a symmetrical perforation pattern of the inlets and outlet parts in the static valve seat disc so that the usual mixed water temperature ranges, which constitute a so-called comfort zone, and therefore, the corresponding mid-position of the mixing chamber cavity is designed to reduce the free flow cross sectional area of the inlet port for the cold water but the mixing chamber cavity is greater than the cross sectional area of the hot water inlet.

2 Claims, 14 Drawing Figures

SANITARY SINGLE-CONTROL MIXER FITTING

FIELD OF THE INVENTION

This invention is directed to a single-control sanitary mixer fitting or valve with regulating elements, which comprise at least two discs of which one serves as a static valve seat disc and includes two inlet ports for cold and hot water, as well as one outlet port, while the second disc is arranged to move on the valve seat disc and having a mixing chamber cavity, which is sufficiently dimensioned for partial or complete connection of the inlet ports with the outlet port of the valve seat disc.

PRIOR ART

When operating mixer fittings in connection with thermally or hydraulically controlled flow heaters, switching errors often occur in the usual mixed water temperature ranges as the heaters require a certain minimum flow rate. If these minimum flow rates are not maintained, the heaters switch off either completely or partially. For this reason, switching errors can easily occur in the case of the mixer fittings of this type because the flow cross sections are relatively narrow and, during the mixing operation, are greatly influenced by relatively small movements of the operating lever. On the hot water side, this rapidly leads to the minimum flow rate not being maintained, particularly since the pressure of hot water is not as high as that of the cold water.

SUMMARY OF THE INVENTION

The invention is based on the object of overcoming these disadvantages and to create a sanitary, single-control mixer fitting of the type mentioned, which, despite its very simple design, ensures reliable operation in connection with flow heaters. This objective has been achieved by providing a mixing chamber cavity in the moving disc that is of asymmetrical form in relation to a symmetrical perforation pattern in the static seal disc in such a way that in the usual mixed water temperature ranges, which constitute a so-called comfort zone, and therefore in the corresponding mid positions of the operation lever, the mixing chamber cavity is designed to reduce the free flow cross section in the area of the inlet port for the cold water to a greater extent than in the case of the hot water side. According to a further development of the invention, the inlet ports are of oblong form and the contour edge or regulating edge of the mixing chamber cavity is, in the area of the inlet port for the cold water, arranged transversely to the longitudinal direction of this port.

According to the invention, the mixing chamber cavity in the moving disc is positioned and designed relative to the inlet ports in the static valve seat disc so that during mixing, the flow cross section for the hot water remains largely unaffected and correspondingly wide open while the flow cross section for the cold water is comparatively reduced.

BRIEF DESCRIPTION OF THE INVENTION

The drawing shows one design example of the invention subject matter as follows.

Figure 13:
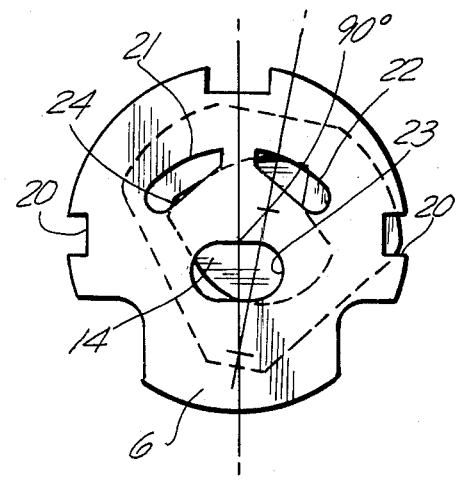

FIG. 3-13 illustrate in bottom plan views of the static valve seat disc, the various operating positions of the moving disc shown in dotted-line, namely in closed position (FIG. 3), in hot water positions (FIGS. 4-7), in mixed water positions (FIGS. 8-12), and in a cold water position (FIG. 13). The various operating positions of the moving disc are indicated by the angle $\theta$ 45° (FIG. 3) and 0° to 90° (FIGS. 4-13).

DETAIL DESCRIPTION OF THE EMBODIMENT

Figure 1:
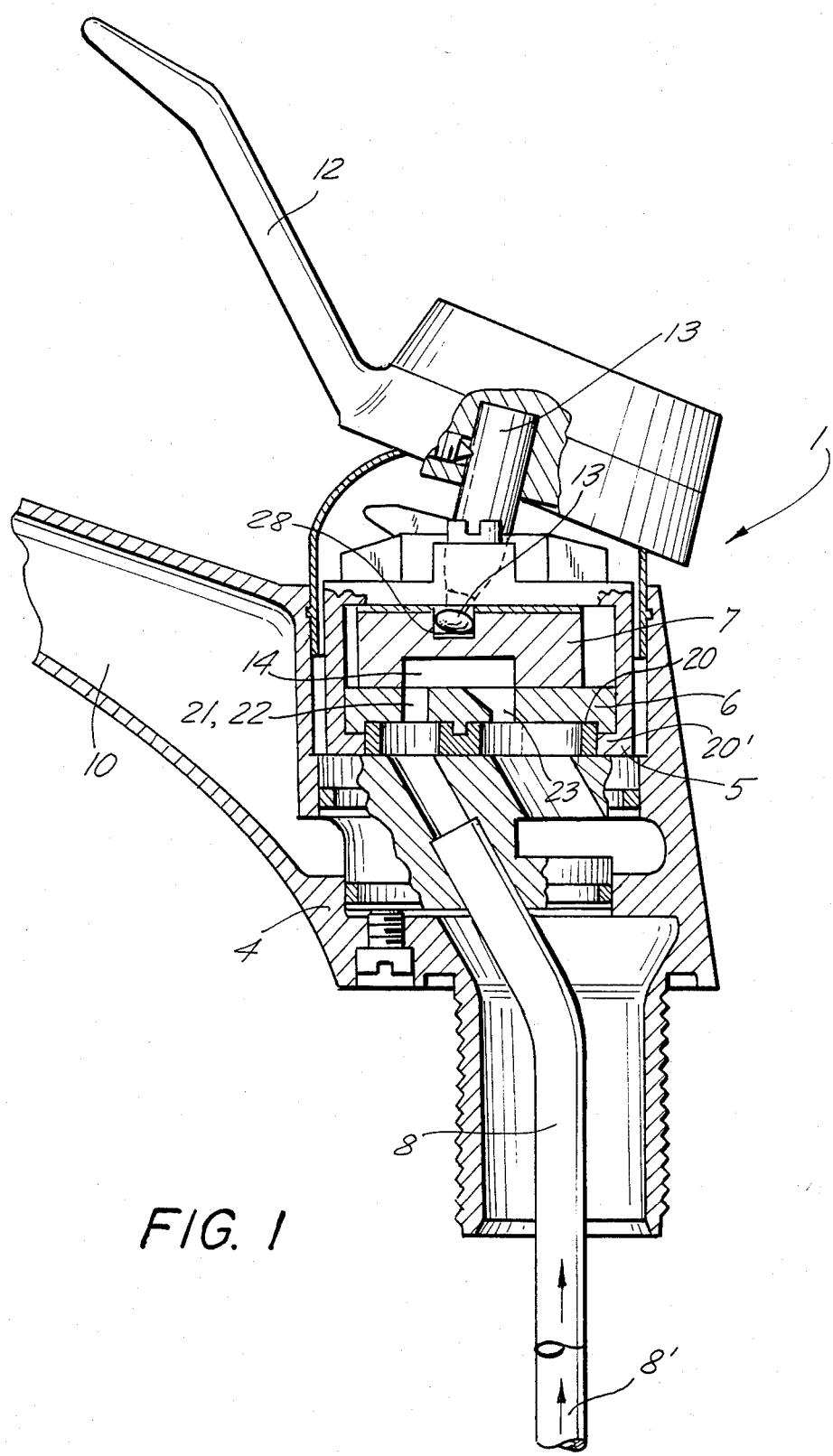
FIG. 1 is an elevational view in section of a single-control mixer fitting in accordance with the invention.
Figure 2:
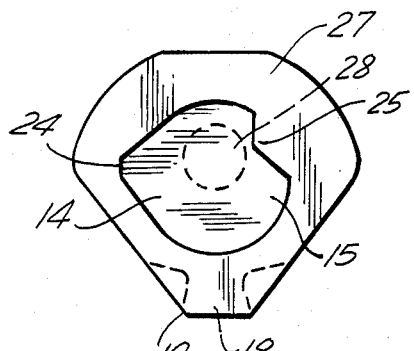
FIG. 2 is a bottom plan view of the shiftable disc.
Figure 2A:
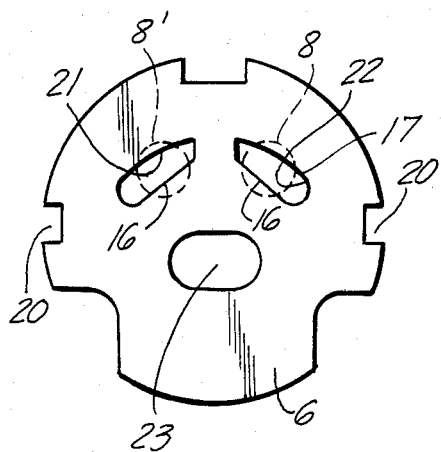
FIG. 2A is a top plan view of the static valve seat disc.
Figure 3:
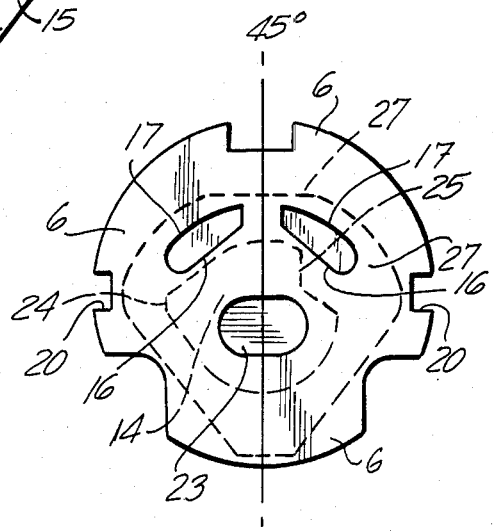
Figure 4:
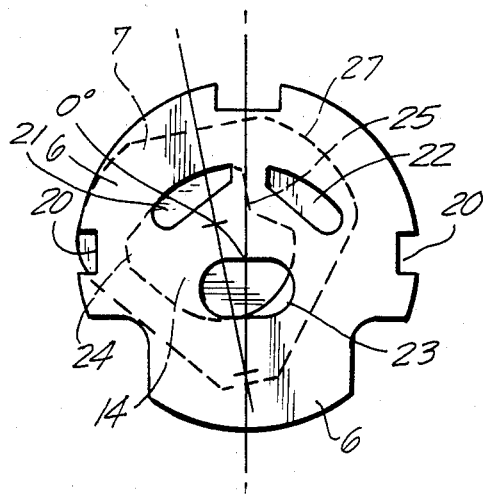
Figure 5:
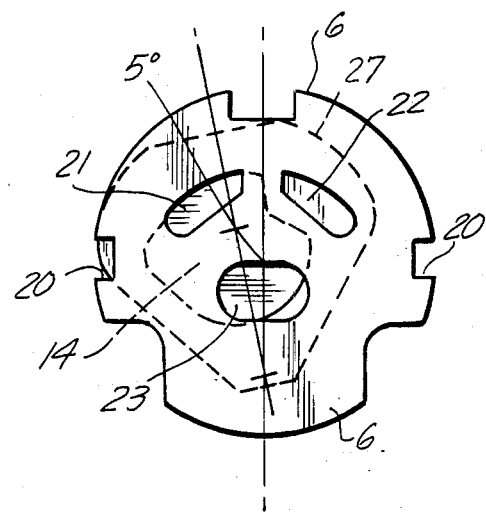
Figure 6:
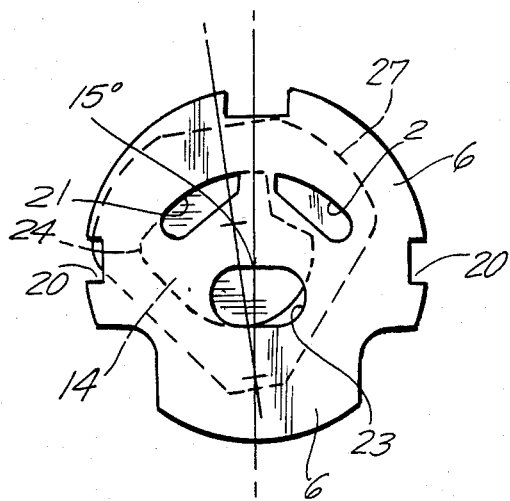
Figure 7:
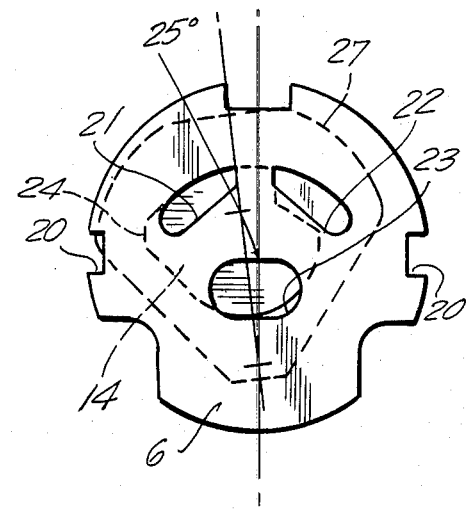
Figure 8:
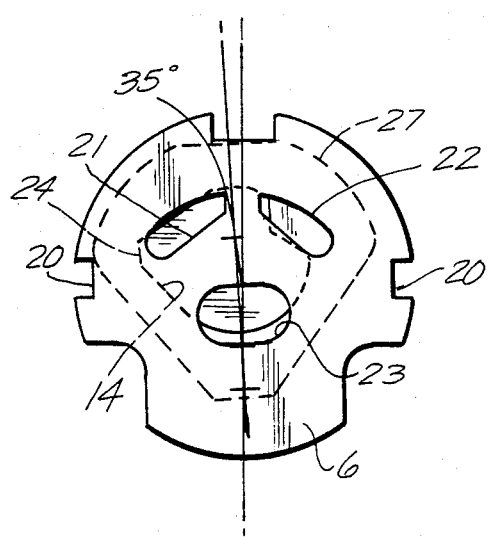
Figure 9:
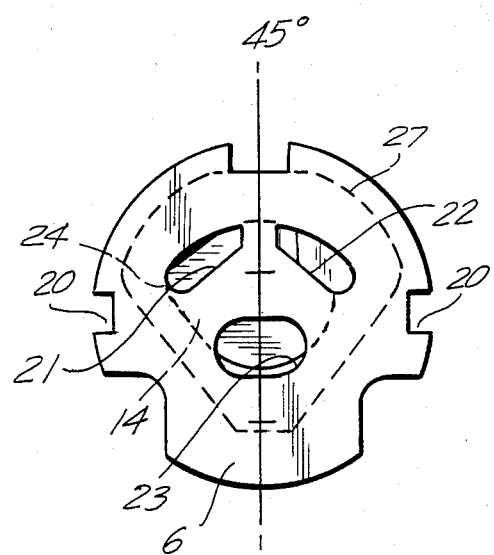
Figure 10:
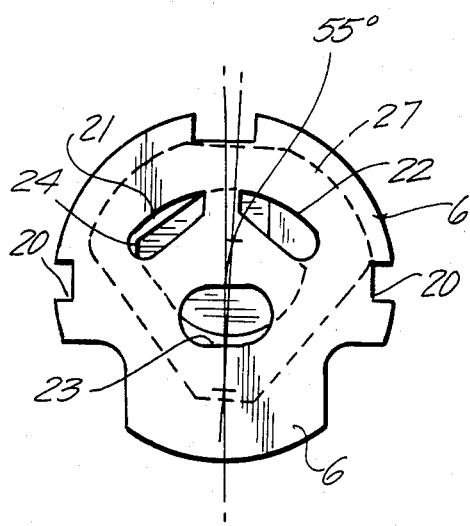
Figure 11:
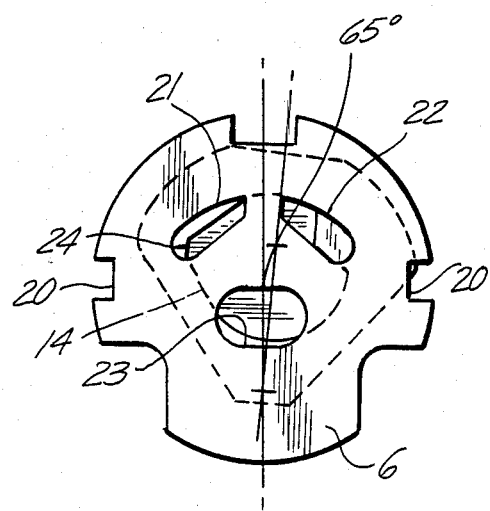
Figure 12:
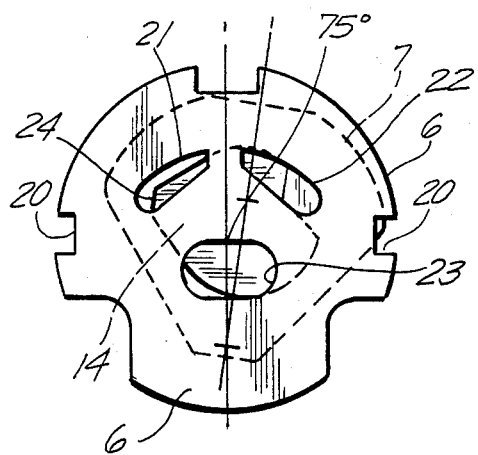

Referring to FIG. 1, there is illustrated a single-control mixer fitting 1, a valve body 4 in which a cartridge 5 is arranged with regulating elements in the form of two discs 6 and 7. Disc 6 is formed having a recess 20, which nests on a corresponding flange 20' of cartridge to statically mount valve seat disc 6. Disc 6 includes an inlet port 21 for hot water and an inlet port 22 for cold water, as well as an outlet port 23, which leads to an outlet 10. The inlet ports 21,22 are of oblong form with a curved boundary edge 17 and a straight boundary edge 16. Disc 7 is arranged on the valve seat disc 6 and is shiftable horizontally thereon by means of a regulating lever 13, which is connected to an operating lever 12 and which engages in a recess 28. Shiftable disc 7 includes a cavity in the form of a mixing chamber 14, which is open towards the valve seat disc 6, and which performs mixing and flow guide functions. The mixing chamber 14 can, furthermore, be brought into communication to varying degrees with the inlet ports 21,22 and the outlet port 23, as illustrated in FIGS. 3-13. The inlet ports 21,22 for the cold and hot water is connected by connection tube 8,8', respectively. The moving disc 7 is provided with a shouldered projection 18 with a thickened end 19, which is located between the parallel ribs, not illustrated, of the inner wall of the casing of the cartridge 5. As is further evident from FIGS. 3-13, the mixing chamber cavity 14 is asymmetrically formed relative to the symmetrical inlet and outlet openings 21, 22, 23 in the static valve seat disc 6 in such a way that the usual mixed water temperature ranges, which constitute a so-called comfort zone, and therefore in the corresponding mid-positions of the operating lever 12, the mixing chamber cavity 14 is designed to reduce the free flow cross section in the area of the inlet port 22 for the cold water to a greater extent than in the case of the hot water side. The contour or regulating edge 25 of the mixing chamber cavity 14 runs transversely to the longitudinal direction of the oblong inlet port 22. These positions are not the usual mixed water temperature ranges and in the corresponding mid-positions of the operating lever 12, the free flow cross section for the hot water is largely unaffected, while on the cold water side, the free flow cross section is, at the same time, considerably reduced. The sealing face 27 of the shiftable disc 7 substantially covers over the inlet port 22, as shown in FIGS. 8-13.

The illustrated and described design is only one example of practicing the invention and should not be limited thereby, since other changes and variations may be made within the scope of the invention, such as with regard to the special design and arrangement of the mixing chamber cavity relative to the inlet ports. As regards the term "comfort zone" generally relates to the mixed water temperature range between approximately 35° C. and 45° C. Furthermore, within this comfort zone a relatively large movement of the operating lever should only bring about a relatively small change in the mixed water temperature.

I claim:

1. A sanitary single-control mixer fitting comprising:

a valve body having regulating elements;

said regulating elements including at least two discs, of which one serves as a static valve seat disc, having two inlet ports for cold and hot water, and an outlet port;

said second disc is shiftably mounted on the said valve seat disc, and includes a mixing chamber cavity, which is sufficiently dimensioned for partial or complete connection of the inlet ports with the outlet port in said valve seat disc;

said mixing chamber cavity of said shiftable disc being asymmetrically formed in relation to a symmetrical formation of said inlets and outlet ports in the static valve seat disc; and said mixing chamber cavity being shaped to reduce the flow cross sectional area of the inlet port for the cold water and is of greater cross sectional area than the hot water inlet so that the flow of hot water is substantially unaltered while the flow of cold water substantially reduced.

2. The sanitary single-lever mixer fitting, according to claim 1, wherein said inlet ports are of oblong form and the regulating edge of said mixing chamber cavity adjacent said inlet port for the cold water is arranged transverse to the longitudinal direction of said port.

* * * * *